United States Patent
Kwoka (12)

(10) Patent No.: US 6,267,214 B1
(45) Date of Patent: Jul. 31, 2001

(54) DIFFERENTIAL-SPEED-DEPENDENT AUTOMATIC COUPLING WITH REDUCTION SWITCHING MEANS

(75) Inventor: Georg Kwoka, Much (DE)

(73) Assignee: GKN Viscodrive GmbH, Lohmar (DE)

( * ) Notice: Subject to any disclaimer, the term of this patent is extended or adjusted under 35 U.S.C. 154(b) by 0 days.

(21) Appl. No.: 09/464,976

(22) Filed: Dec. 16, 1999

(30) Foreign Application Priority Data

Dec. 17, 1998 (DE) .............................................. 198 58 334

(51) Int. Cl.[7] .......................... F16D 35/00; F16D 43/16; F16D 47/06
(52) U.S. Cl. ................... 192/48.5; 192/57; 192/58.41; 192/58.42; 192/104 B
(58) Field of Search .................... 192/48.5, 57, 58.41, 192/58.42, 104 B, 105 BB, 103 B

(56) References Cited

U.S. PATENT DOCUMENTS

| 4,690,258 | * | 9/1987 | Teraoka et al. | 192/57 |
| 5,156,247 | * | 10/1992 | Weise et al. | 192/48.5 X |
| 5,273,147 | * | 12/1993 | Beigang et al. | 192/103 B X |
| 5,338,266 | * | 8/1994 | Guimbretiere | 475/89 |

FOREIGN PATENT DOCUMENTS

| 3823 180 C1 | 2/1990 | (DE) . |
| 196 53 310 C1 | 12/1996 | (DE) . |
| 1-224528 | * 5/1987 | (JP) . |
| 62-118123 | * 5/1987 | (JP) . |
| 63-9734 | * 1/1988 | (JP) . |

* cited by examiner

Primary Examiner—Richard M. Lorence

(57) ABSTRACT

A viscous coupling comprising two parts which are supported inside one another, which are rotatable around a common longitudinal axis and which form an annular chamber which is filled with a highly viscous medium and in which there are arranged inner plates which are non-rotatably connected to the inner one of the parts and form a set of inner plates, as well as outer plates which are non-rotatably connected to the outer one of the parts and form a set of outer plates, said inner plates and outer plates being arranged so as to alternate in the longitudinal direction for the purpose of generating a coupling effect between the two parts when the latter rotate relative to one another, wherein a partial set of one of the sets of inner plates and outer plates is directly carried by a sleeve which is connected to the part of the coupling which carries said set of inner plates or outer plates in such a way that it can be uncoupled.

20 Claims, 2 Drawing Sheets

DIFFERENTIAL-SPEED-DEPENDENT AUTOMATIC COUPLING WITH REDUCTION SWITCHING MEANS

BACKGROUND OF THE INVENTION

The invention relates to a coupling, either in the form of an conventional viscous coupling or in the form of a Viscotrac® coupling, comprising two parts which are supported inside one another, which are rotatable around a common longitudinal axis and which form an annular space which is filled with a highly viscous medium and in which there are arranged inner plates which are non-rotatably connected to the inner one of the parts and form a set of inner plates, as well as outer plates which are non-rotatably connected to the outer one of the parts and form a set of outer plates, said inner plates and outer plates being arranged so as to alternate in the longitudinal direction for the purpose of generating a coupling effect between the two parts when the latter rotate relative to one another.

In the case of conventional viscous couplings such as those described in DE 38 23 180 C1, the differential-speed-dependent or wheel-slip-dependent engaging effect is based on the build-up of shear forces in the viscous medium in the spaces between inner plates and outer plates.

In the applicant's Viscotrac® coupling described in DE 196 53 310 A1, differential-speed-dependent or wheel-slip-dependent shear forces are built up in the viscous medium in the spaces between inner plates and outer plates in the same way as described above. In addition, in a helical channel between a cylindrical surface of an annular piston dividing the annular space into two chambers and a counter face of the annular space, a medium is conveyed by shear forces from the one chamber into the other chamber, so that the annular piston is axially displaced in the annular space and moves part of the inner plates and outer plates of the coupling plate type into friction contact.

Couplings of said type are used in the driveline of a motor vehicle which comprises both a constantly driven axle and an axle that is driven only if there exists slip between the wheels of the axles, the couplings being provided in the connecting driveline between the two axles.

Under operational conditions, for example, when accelerating from start conditions or during off-highway driving or in curves, when at the constantly driven axle there is wheel-slip, there occurs a relative rotation between the coupling parts, as a result of which a coupling effect is built up, so that the second axle is also driven. In the case of vehicles with new types of driving dynamics systems which, for instance, cause the brake to engage in individual wheels if lateral guidance is lost at the wheels, just as in the case of vehicles with anti-lock braking systems which release the braking force when a wheel is locked, control must be affected only to a slight extent by said coupling engagement. It is therefore the object of the present invention to provide a coupling of the above-mentioned type which is more compatible with control systems for driving dynamics and with anti-lock braking systems of motor vehicles.

BRIEF SUMMARY OF THE INVENTION

The present invention is embodied in and carried out by a coupling of the aforesaid type, wherein in the case of a viscous coupling, the objective is achieved in that a partial set of one of the complete sets of inner plates and outer plates is directly carried by a sleeve which is coupled to that part of the coupling which carries said complete set of inner plates or outer plates in such a way that it will be uncoupled in respect of relative rotation at a raised rotational speed. The corresponding solution in the case of a Viscotrac® coupling consists in that the annular piston is carried directly by a sleeve which is connected to the coupling part carrying the annular piston in such a way that it will be uncoupled therefrom in respect of relative rotation at a raised rotational speed. In particular, it is proposed that a partial set of one of the sets of inner plates and outer plates is also carried directly by the sleeve. The above-mentioned helical channel can be formed by a groove in the cylindrical surface, or in the counter face of the annular space, or optionally in an inserted sleeve.

By using a coupling of this type, it is possible to provide a two-part characteristic curve with a jump function which, in a first portion over the rotational speed follows the characteristics of a viscous coupling or of a Viscotrac® coupling of a certain size and, in a second portion over the rotational speed, represents the characteristics of a viscous coupling with a much smaller number of plates. The latter characteristics are able to provide the comparability with a control system for driving dynamics, a slip limiting control system or an anti-lock braking system. The coupling can be switched from one part of the characteristic curve to the other part of the characteristic curve by any conceivable means, in particular by magnetic, pneumatic or hydraulic means, with the switching process being released by the corresponding control system for driving dynamics or the corresponding anti-lock braking system. All these systems record the vehicle speed and hence the rotational speed of the coupling, which is decisive for the switching process.

According to a preferred simple solution, switching can be effected by a mechanical setting device which is actuated by a centrifugal force and which is integrated into the coupling. In such a case again, it has to be assumed that the rotational speed of the coupling is proportional to the vehicle speed. The setting device actuated by a centrifugal force can comprise circumferentially positioned ball members which, on the one hand, are supported on a first radial face and, on the other hand, on the conical face of an axial adjusting element. The coupling device for the sleeve actuated in this way can, substantially, comprise a central draw key which, in the case of an axial adjustment, causes dwelling balls to engage, or be disengaged from, the respective part of the coupling or of the sleeve in a rotationally positive way. Further preferred embodiments of the invention are described hereunder in further subclaims to which reference is made hereby.

BRIEF DESCRIPTION OF THE DRAWINGS

The written description of the present invention will be more fully understood when read with reference to the accompanying drawings, of which.

DETAILED DESCRIPTION OF THE INVENTION

Figure 1:
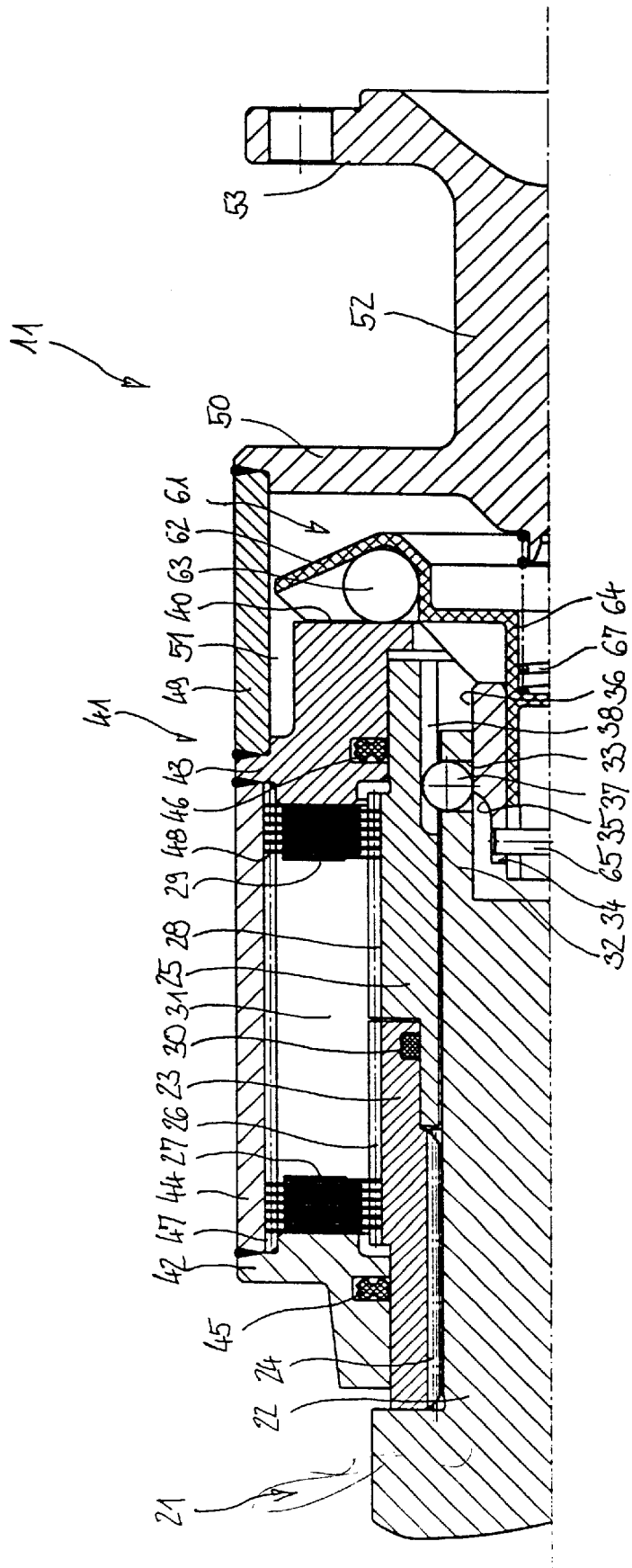
FIG. 1 is half a longitudinal section through an inventive coupling in the form of a viscous coupling.

FIG. 1 shows a viscous coupling 11 which substantially consists of a first part 21 in the form of a shaft and a second part 41 in the form of an annular housing which, together, form a cylindrical annular space 31. The first part 21 comprises a hub 22 and a first sleeve 23 which is non-rotatably connected to the hub 22 by longitudinal toothing means 24. In addition, the first part 21 carries a second sleeve 25 which, in the direction of rotation, can be coupled with, and uncoupled from, the hub 22 by means yet to be described in greater detail. The first sleeve 23 comprises outer longitudinal toothing means 26 on to which there is slid a first partial set of inner plates 29. The two sleeves 23, 25 are sealed relative to one another by a sealing ring 30.

The second part 41 also consists of several components and comprises two cover parts 42,43 which are connected to one another by a casing 44, with said three parts, together with the sleeves 23, 25, forming the annular space 31. The cover 42 is sealed by a seal 45 relative to the first sleeve 23, and the cover 43 is sealed by a seal 46 relative to the second sleeve 25. In the casing part 44, there are provided inner longitudinal toothing means 47 into which there is non-rotatably inserted a set of outer plates 48. Individual inner plates 27, 29 alternate the outer plates 48 in the longitudinal direction. As is usual in the case of a viscous coupling, the annular space 31 is at least partially filled with a highly viscous medium.

The hub 22 is followed by a sleeve projection 32 comprising circumferentially distributed radial bores 33. The second sleeve 25 is provided with inner grooves or inner recesses 38 which are circumferentially distributed in the same way as the radial bores 33. Inside the sleeve projection 32 there is provided a draw key 34 with a ramp face 35 and a cylindrical locking face 36. In each of the bores 33 there are held dwelling balls 37 which, in their position as illustrated, in which they are supported by the locking face 36, provide a non-rotatable connection for the purpose of coupling the hub 22 with the sleeve 25. When the draw key 34 is displaced towards the right, the dwelling balls 37—upon rotation of the sleeve 25 relative to the hub 22—can be pressed inwardly over the ramp face 35, so that the hub 22 and the sleeve 25 are uncoupled. When the draw key 34 is pushed back towards the left into the position as illustrated, the dwelling balls 38 are pressed over the ramp faces 35 so that they simultaneously engage radial bores 33 and inner grooves 38.

The second part 41, furthermore, comprises a second casing part 49 which is connected to the cover 43 and which, together with a further cover 50, forms an inner space 51. The cover 50 is integrally followed by a journal 52 which integrally passes into a flange 53. In the inner space 51, there is provided an axial adjusting element comprising a conical cover 62 containing spherical centrifugal weights 63. The latter are supported on a radial end face 40 of the cover 43. The conical cover 62 is connected to a journal 64 on to which there is pressed the draw key 34 in the form of a sleeve. The draw key 34 and the journal 64 are non-rotatably coupled relative to one another by a pin 65.

A helical spring 67 holds the axial adjusting element 61 in the outermost left-hand position as illustrated, with the spring force being sufficient to bias the forces acting on the centrifugal weights 63. From a certain increased speed onwards, the centrifugal force becomes high enough for displacing the conical cover 62 and thus the journal 64 by means of the outwardly urging centrifugal weights 63, so that the dwelling balls 37 can reach the region of the ramp faces 35, with the sleeve 25 being uncoupled from the hub 23. As a result of the shear forces acting via the second set of inner plates 29, the sleeve 25 is then taken around by the outer plates 48, so that it is no longer possible for any torque to be transmitted by the second set of inner plates 29 from the first part 21 to the second part 41. The coupling function of the first set of inner plates 27 relative to the associated plates 48 is a result of viscous shear forces in the medium between the plates.

Figure 2:
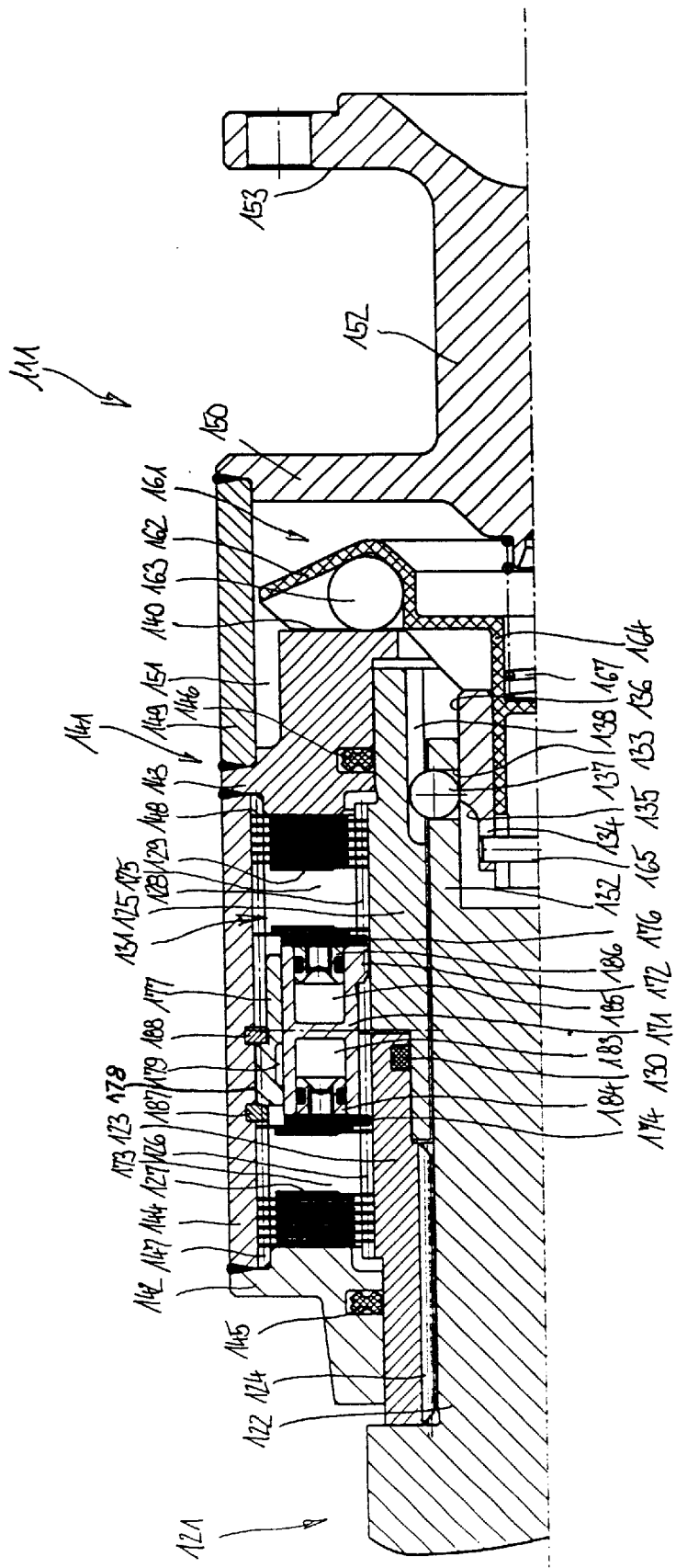
FIG. 2 is half a longitudinal section through an inventive coupling in the form of a Viscotrac® coupling.

FIG. 2 shows a Viscotrac® coupling 111 which substantially consists of a first part 121 in the form of a shaft and a second part in the form of an annular housing which, together, form a cylindrical annular space 131. The first part 121 comprises a hub 122 and a first sleeve 123 which is non-rotatably connected to the hub 122 by longitudinal toothing means 124. In addition, the first part 121 carries a second sleeve 125 which, in the direction of rotation, can be coupled with, and uncoupled from, the hub 122 by means yet to be described in greater detail. The first sleeve 123 comprises outer longitudinal toothing means 126 on to which there is slid a first partial set of inner plates 129. The two sleeves 123, 125 are sealed relative to one another by a sealing ring 130. The second part 141 also consists of several components and comprises two cover plates 142, 143 which are connected to one another by casing part 144, with said three parts, together with the sleeves 123, 125, forming the annular space 131. The cover 142 is sealed by a seal 145 relative to the first sleeve 123, and the cover 143 is sealed by a seal 146 relative to the second sleeve 125. In the casing part 144, there are provided inner longitudinal toothing means 147 into which there is non-rotatably inserted a set of outer plates 148.

Individual inner plates 127, 129 alternate with the outer plates 148 in the longitudinal direction. In the center of the annular space 131, there is arranged an annular piston 171 which, via driving means 172, engages the longitudinal outer toothing means 128 of the second sleeve 125 and is thus non-rotatably coupled thereto, but longitudinally displaceable therefrom. The annular piston 171 divides the annular space 131 into two chambers 173, 175. The annular piston 171 is surrounded by a sleeve 177 which sleeve, via driving means 178, engages the inner toothing means 147 in the casing part 144 and is thus non-rotatably coupled thereto. Two securing rings 187, 188 axially hold the sleeve 177 relative to the casing part 144. In its inner surface, the sleeve 177 comprises a helical groove 179 which connects the chambers 173, 175 to one another. In its ends, the annular piston 171 is provided with annular chambers 183, 185 in which there are positioned compensating pistons 184, 186. Directly adjoining the annular piston 171, there is provided a reinforced pressure disc 174, 176 in the chambers 173, 175. As is common practice with a Viscotrac® coupling, the annular space 131 is filled with a highly viscous medium.

If there occurs a relative rotation between the annular piston 171 and the sleeve 177, medium is conveyed via the groove 179 from the one chamber into the other chamber and in consequence, the annular piston is displaced in the opposite direction, as a result of which it brings the inner plates and outer plates in said chamber into contact with one another, so that there are generated high braking forces which can lead to the first part 121 and the second part 141 rotating at identical speeds.

The hub 122 is followed by a sleeve projection 132 which comprises circumferentially distributed radial bores 133. In the second sleeve 125, there are provided inner grooves or inner recesses 138 which are circumferentially distributed in the same way as the radial bores 133. Inside the sleeve projection 132, there is located a draw key 134 with a ramp face 135 and a cylindrical locking face 136. In the bores 133 there are accommodated dwelling balls 137 which, in the position as illustrated wherein they are supported by the locking face 136, provide a non-rotatable connection to ensure that the hub 122 and the sleeve 125 are coupled to one another. If the draw key 134 is displaced towards the right, the dwelling balls 137 can be pressed inwardly via the ramp face 135 when the sleeve 125 rotates relative to the hub 122, so that the hub 122 and the sleeve 125 are uncoupled. When the draw key 134 is moved back towards the left into the position as illustrated, the dwelling balls 137 are pressed back via the ramp face 135 into simultaneous engagement with the bores 133 and the inner grooves 139.

The second part 141, furthermore, comprises a second casing part 149 which is connected to the cover 143 and which, together with a further cover 150, forms an inner space 151. The cover 150 is radially followed by a journal 152 which integrally changes into a flange 153. In the inner space 151, there is provided an axial adjusting element 161 comprising a conical cover 162 in which there are positioned spherical centrifugal weights 163 which are supported on a radial end face 140 of the cover 143. The conical cover 162 is connected to a journal 164 on to which there is pressed the draw key 134 in the form of a sleeve. The draw key 134 and the journal 164 are non-rotatably connected by a pin 165.

A helical spring 167 holds the axial adjusting element 161 in the outermost left-hand position, with the spring force being sufficient to bias the forces acting on the centrifugal weights 163. From a certain increased speed inwards, the centrifugal force becomes sufficiently high to displace the conical cover 162 and thus the journal 164 by means of the outwardly-urging centrifugal weights 163, so that the dwelling balls 137 are able to reach the region of the ramp face 135, with the sleeve 125 being uncoupled from the hub 123. As a result of the shear forces in the groove 179 between the sleeve 177 and the annular piston 171 and between the second set of inner plates 129 and the associated outer plates 148, the sleeve 125 is then taken around, so that medium is no longer conveyed between the chambers by the annular piston 171 and in consequence, torque is no longer transmitted by the second set of inner plates 129 from the first part 121 to the second part 141, neither by friction forces as a result of contact between the plates nor by viscous shear forces in the medium between the plates. The coupling function of the first set of inner plates 127 relative to the associated outer plates 148 is a result of viscous shear forces in the medium between the plates.

Certain modifications and variations of the disclosed embodiments of the present invention will be apparent to those skilled in the art. It should be understood that the disclosed embodiments are intended to be illustrative only, and not in any way restrictive of the scope of the invention as defined by the claims set forth hereunder.

I claim:

1. A viscous coupling (11) comprising inner and outer parts (21, 41) supported inside one another and rotatable relative to one another around a common longitudinal axis, and forming an annular space (31) which is filled with a highly viscous medium in which there are arranged inner plates (27, 29) which are non-rotatably connected to said inner part (21) and form a set of inner plates, as well as outer plates (48) which are non-rotatably connected to said outer part (41) and form a set of outer plates, said inner plates (27, 29) and said outer plates (48) being arranged so as to alternate in the longitudinal direction for the purpose of generating a coupling effect between said two parts (21, 41) when the latter rotate relative to one another, wherein a partial set (29) of one of said complete sets of inner plates and outer plates is directly carried by a sleeve (25) which is coupled to the respective one of said inner part (21) and said outer part (41) of the coupling (11), which carries said complete set of inner plates or outer plates in such a way that it can be uncoupled in respect of relative rotation at a raised rotational speed in that it provides a two-part characteristic curve with a declining jump function of coupling forces over rotational speed.

2. A Viscotrac® coupling (111) comprising inner and outer parts (121, 141) supported inside one another and rotatable relative to one another around a common longitudinal axis, and forming an annular space (131) which is filled with a highly viscous medium in which there are arranged inner plates (127, 129) which are non-rotatably connected to said inner part (121) and form a set of inner plates, as well as outer plates (148) which are non-rotatably connected to said outer part (141) and form a set of outer plates, said inner plates (127, 129) and outer plates (148) being arranged so as to alternate in the longitudinal direction for the purpose of generating a coupling effect between said inner and outer parts (121, 141) when the latter rotate relative to one another, wherein in the annular space (131) an annular piston (171) is arranged axially between said plates to axially divide said annular space (131) into two chambers (173, 175), and is connected to one of said inner part (121) and said outer part (141) by means of driving elements (172) in a non-rotatable and axially movable way, wherein said annular piston (171) by means of one of its cylindrical faces, rests against a counter face of the other one of said inner part (121) and said outer part (141) and wherein, between said one cylindrical face and said counter face, there is formed at least one channel (179) which extends helically relative to the longitudinal axis and which connects said two chambers (173, 175) to one another wherein said annular piston (171) is carried directly by a sleeve (125) which is coupled to that one of said inner part (121) and said outer part (141) of the coupling which carries said annular piston (171) in such a way it can be uncoupled in respect of relative rotation at a raised rotational speed in that it provides a two-part characteristic curve with a declining jump function of coupling forces over rotational speed.

3. A coupling according to claim 2, wherein a partial set (129) of said sets of inner plates (127, 129) and outer plates (148) is also directly carried by said sleeve (125).

4. A coupling according to claim 2 or 3, wherein said counter face is formed in a sleeve (177) non-rotatably connected to the other one of said inner part (121) and said outer part (141) by means of further driving elements (178).

5. A coupling according to any one of claims 1 or 2, wherein a coupling device between said sleeve (25, 125) and said one of said outer part and said outer part (21, 121) consists of a ball locking device actuated by a draw key (34, 134).

6. A coupling according to claim 5, wherein said draw key (34, 134) is actuated by an axial adjusting device (61, 161) which, in turn, is actuated by a centrifugal force.

7. A coupling according to claim 6, wherein said axial adjusting device (61, 161) comprises ball members (63, 163) which are supported on a fixed radial face (40, 140) and which act on a conical face (62, 162) of a setting member (64, 164).

8. A coupling according to any one of claims 1 or 2, wherein said inner plates (27, 29, 127, 129) and said outer plates (48, 148) are axially movably held in said annular space (31, 131).

9. An improvement in a viscous coupling which comprises inner and outer parts supported inside one another and rotatable relative to one another around a common longitudinal axis, and forming an annular space which is filled with a highly viscous medium; and a set of inner plates arranged within said annular space and non-rotatably connected to said outer part, and a set of outer plates non-rotatably connected to said outer part, said sets of inner plates and outer plates being arranged so as to alternate in the longitudinal direction for the purpose of generating a coupling effect between said inner and outer parts when said inner and outer parts rotate relative to one another, said improvement comprising: a partial set of one of said sets of inner plates and outer plates is directly carried by a sleeve which is coupled to that one of said inner and outer parts which carries said set of inner plates or outer plates in such a way that it can be uncoupled in respect of relative rotation at a raised rotational speed in that it provides a two-part characteristic curve with a declining jump function of coupling forces over rotational speed.

10. The improvement according to claim 9, wherein a coupling device between said sleeve and said one of said outer part and said outer part consists of a ball locking device actuated by a draw key.

11. The improvement according to claim 10, wherein said draw key is actuated by an axial adjusting device which, in turn, is actuated by a centrifugal force.

12. The improvement according to claim 11, wherein said axial adjusting device comprises ball members which are supported on a fixed radial face and which act on a conical face of a setting member.

13. The improvement according to any one of claims 9 to 12, wherein said inner plates and said outer plates are axially movably held in said annular space.

14. An improvement in a Viscotrac® coupling which comprises inner and outer parts supported inside one another and rotatable relative to one another around a common longitudinal axis, and forming an annular space which is filled with a highly viscous medium; inner plates non-rotatably connected to said inner part and forming a set of inner plates arranged within said annular space; outer plates non-rotatably connected to said outer part and forming a set of outer plates, said inner plates and outer plates being arranged so as to alternate in the longitudinal direction for the purpose of generating a coupling effect between said inner and outer parts when said inner and outer parts rotate relative to one another, wherein in said annular space an annular piston is arranged axially between said plates to axially divide said annular space into two chambers, and is connected to one of said inner and outer parts by means of driving elements in a non-rotatable and axially movable way, wherein said annular piston, by means of one of its cylindrical faces, rests against a counter face of the other one of said inner and outer parts and wherein, between said one cylindrical face and said counter face, there is formed at least one channel which extends helically relative to said longitudinal axis and which connects said two chambers to one another, the improvement comprising: said annular piston is carried directly by a sleeve which is coupled to that one of said inner and outer parts which carries said annular piston in such a way it can be uncoupled in respect of relative rotation at a raised rotational speed in that it provides a two-part characteristic curve with a declining jump function of coupling forces over rotational speed.

15. The improvement according to claim 14, wherein a partial set of said sets of inner plates and outer plates is also directly carried by said sleeve.

16. The improvement according to claim 14 or 15, wherein said counter face is formed in a sleeve non-rotatably connected to the other one of said inner part and said outer part by means of further driving elements.

17. The improvement according to any one of claims 14 or 15, wherein a coupling device between said sleeve and said one of said outer part and said outer part consists of a ball locking device actuated by a draw key.

18. The improvement according to claim 17, wherein said draw key is actuated by an axial adjusting device which, in turn, is actuated by a centrifugal force.

19. The improvement according to claim 18, wherein said axial adjusting device comprises ball members which are supported on a fixed radial face and which act on a conical face of a setting member.

20. The improvement according to any one of claims 14 or 19, wherein said inner plates and said outer plates are axially movably held in said annular space.

* * * * *